(12) United States Patent
Reynolds et al.

(10) Patent No.: US 6,768,717 B1
(45) Date of Patent: Jul. 27, 2004

(54) APPARATUS AND METHOD FOR TRAFFIC SHAPING IN A NETWORK SWITCH

(75) Inventors: Mike Reynolds, Subiaco (AU); Todd Lowpensky, Hillsborough, CA (US); Richard Lemyre, Brossard (CA)

(73) Assignee: Network Equipment Technologies, Inc., Fremont, CA (US)

( * ) Notice: Subject to any disclaimer, the term of this patent is extended or adjusted under 35 U.S.C. 154(b) by 0 days.

(21) Appl. No.: 09/580,222

(22) Filed: May 26, 2000

(Under 37 CFR 1.47)

Related U.S. Application Data

(60) Provisional application No. 60/136,953, filed on May 28, 1999.

(51) Int. Cl.[7] ............................................. H04L 12/26
(52) U.S. Cl. ............... 370/230.1; 370/235; 370/395.21; 370/395.4; 370/412; 370/463
(58) Field of Search ................................. 370/229, 230, 370/230.1, 235, 236, 395.1, 395.4, 395.21, 401, 402, 447, 461, 462, 463, 412, 413, 414, 415, 416, 417, 418

(56) References Cited

U.S. PATENT DOCUMENTS

| | | | |
|---|---|---|---|
| 5,132,966 A | 7/1992 | Hayano et al. | 370/79 |
| 5,418,781 A | 5/1995 | Kaufman et al. | 370/60 |
| 5,633,861 A | 5/1997 | Hanson et al. | 370/232 |
| 5,768,271 A | 6/1998 | Seid et al. | 370/389 |
| 5,884,064 A | 3/1999 | Rosenberg | 395/500 |
| 5,903,559 A | 5/1999 | Acharya et al. | 370/355 |
| 5,978,356 A | 11/1999 | Elwalid et al. | 370/230 |
| 6,157,614 A * | 12/2000 | Pasternak et al. | 370/236 |
| 6,353,618 B1 * | 3/2002 | Hung et al. | 370/459 |
| 6,473,428 B1 * | 10/2002 | Nichols et al. | 370/395.1 |
| 6,535,512 B1 * | 3/2003 | Daniel et al. | 370/395.1 |
| 6,560,195 B1 * | 5/2003 | Basak et al. | 370/230 |

FOREIGN PATENT DOCUMENTS

| | | | |
|---|---|---|---|
| WO | WO 99 09717 | 2/1999 | H04L/12/56 |

OTHER PUBLICATIONS

Copy of International Preliminary Examination Report.
Rexford J. et al., Scalable Architectures For Integrated Traffic Shaping And Link Scheduling In High–Speed ATM Switches, IEEE Journal On Selected Areas In Communications, US, IEEE Inc. Nyew York, vol. 15, No. 5, Jun. 1, 1997, pp. 938–950.

* cited by examiner

*Primary Examiner*—Dang Ton
*Assistant Examiner*—Shick Hom
(74) *Attorney, Agent, or Firm*—Townsend and Townsend and Crew LLP

(57) ABSTRACT

An apparatus and method for traffic shaping in a network switch, which provides for per-connection shaping. A Cell Descriptor (CD)-processing block and a ShapeID processing block operate to de-couple the management of the CDs from the scheduling of the CD output times. The CD-processing block outputs a token (ShapeID) to the ShapeID block. If the token is conforming, it is immediately passed back to the CD-processing block, otherwise it is processed. When the token is "mature" the token is passed back to the CD-processing block. Use of "now" and "later" lists with per-connection ShapeIDs provides priority within a virtual connection (VC) and a virtual path (VP), respectively. This effectively preserves the relative priority for connections being shaped within a VP. Also, the use of a Calendar Queue reduces the complexity of a "virtual finishing time" (VFT) calculation.

10 Claims, 16 Drawing Sheets

N = NODE
S/D = SOURCE/DESTINATION

N = NODE
S/D = SOURCE/DESTINATION

F = FORWARD
R = REVERSE

"burst" cell traffic

| | | | | | | | | | | | | | | | | | | | | | | | | | |

"shaped" cell traffic

| | | | | | | | | | | | | | | | | | | | | | | | | |

| Word | Label | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 0 | CD-0 | Cell Pointer ||||||||||||||||
| 1 | CD-1 | 0 | ATMC # |||| Connection ID |||||||||||
| 2 | CD_2 | MC | Discard Select |||| Queue |||| Port |||| COS |||
| 3 | CD_3 | TS VP Priority || TS VC Priority || SAR | SHAPE | AAL5 | MCOPY | Parity(3 down to 0)[1] |||| PTI ||| CLP[1] |

(1) Shaper may reset CLP but and change bit 3 of parity.

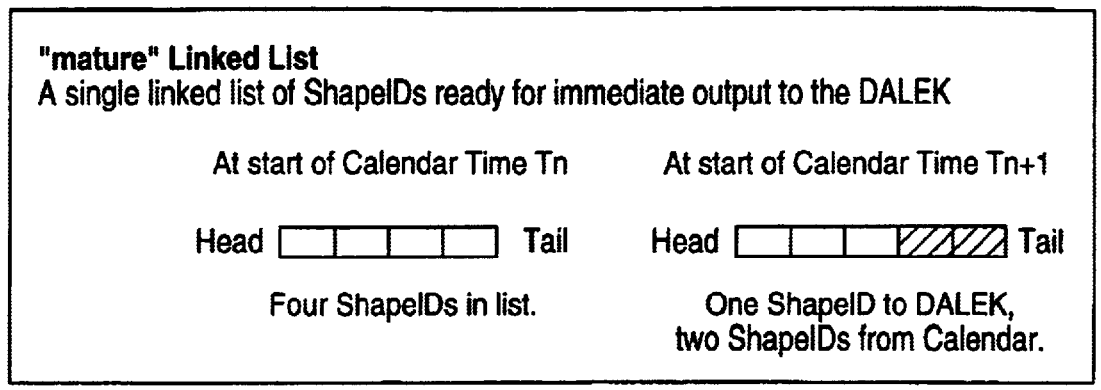

"mature" Linked List
A single linked list of ShapeIDs ready for immediate output to the DALEK At start of Calendar Time Tn — Four ShapeIDs in list.

At start of Calendar Time Tn+1 — One ShapeID to DALEK, two ShapeIDs from Calendar.

FIG. 12

| Configured Min Cell Interval | Integer:Fraction (Hex:Hex) | Description |
|---|---|---|
| smallest | 0002:00 | Highest bandwidth. Approximately 309.4 Mbps. |
| largest | EFFF:FF | Lowest bandwidth. Approximately 9.1 kbps. |

FIG. 13

| Minimum Cell Interval | Cell Rate (cps) | Step Size (cps) | Bit Rate (Mbps) | Step Size (percent) |
|---|---|---|---|---|
| 0002:00 | 730*10³ | 1422 | 309.41 | 0.195% |
| 0002:01 | 728*10³ | | 308.80 | |
| 0002:9D | **558*10³ | 834 | 236.79 | 0.1492** |
| 0004:00 | 365*10³ | 356 | 154.70 | 0.098% |
| 0004:01 | 364*10³ | | 154.55 | |
| 0010:00 | 91.2*10³ | 22 | 38.68 | 0.024% |
| 0010:01 | 91.2*10³ | | 38.67 | |
| 0100:00 | 5.70*10³ | 0.08 | 2.4172 | 0.001% |
| 0100:01 | 5.70*10³ | | 2.4172 | |
| 1000:00 | 356 | small | 151.1kbps | small |
| EFFF:FF | 23.87 | very small | 9.1kbps | very small |
| Step Size meets ITU recommendations for rates below 558478 cps (236.79Mbps) | | | | |

FIG. 14

| | INPUTS | | OUTPUTS | | | |
|---|---|---|---|---|---|---|
| Label | Trigger for scheduling operation | Count | SID to DALEK | SID to Calendar Queue | Count | Schedule Time |
| FirstIn | SID received from DALEK | =0 | Yes | Yes | +1 | CT+MCI |
| NextIn | | /=0 | No | No | +1 | NC |
| NextOut | SID at head of "mature" list sent to DALEK | >1 | Yes | Yes | -1 | ST+MCI |
| GhostOut | | <=1 | Yes | Yes | 0 | NC |
| CT=Current Time, NC=no change, ST=Schedule Time, MCI=Minimum Cell Interval | | | | | | |

FIG. 15

| LABEL | INPUTS | OUTPUT |
|---|---|---|
| No Time Wrap. ST in Window. | (CT < CT+MCI) and (ST < CT+MCI) | ScheduleTime |
| Time Wrap. ST in Window, after Time Wrap. | (CT > CT+MCI) and (ST < CT+MCI) | ScheduleTime |
| Time Wrap. ST in Window, before Time Wrap. | (CT > CT+MCI) and (ST > CT+MCI) | ScheduleTime |
| ST outside Window. | else | Current Time |
| CT = Current Time, MCI = Minimum Cell Interval, ST = Schedule Time "Window" is time period from (Current Time) to (Current Time + Minimum Cell Interval). Time Wrap means (Calendar Time = 0) is in the window. | | |

FIG. 16

| DT Interface | GCRA RAM | MINT RAM | LINK RAM | Notes |
|---|---|---|---|---|
| ShapeID | | | | ShapeID to/from the DALEK. |
| | Read GCRA | | | Get the GCRA configuration and state. |
| | | | | Several cycles to calculate result. (in internal logic) |
| | Write new GCRA | Read Old Head/Tail | | Write update GCRA state. Get in Schedule Time Calendar Queue list. |
| | | | | |
| | | Write new Head/Tail | Write Link to new Tail | Update the Schedule Time Calendar Queue list. Link the old Tail to the new Tail. |

FIG. 17

| DT Interface | GCRA RAM | MINT RAM | LINK RAM | Notes |
|---|---|---|---|---|
| | | Read Head/Tail | | Read the Current Time Calendar Queue List. |
| | | | | |
| | | | | |
| | | | | |
| | | Write null Head/Tail | Write Link from old Tail | Clear the Current Time Calendar Queue list. Link the list to the tail of the "mature" list. |
| | | | Read next ShapeID in list | Get the second ShapeID in the "mature" list. (so ready to pass it to DALEK if necessary). |
| | | | | |
| ShapeID | | | | Head of "mature" list to DALEK. |
| | | | | |
| | | | Read next ShapeID in list | Get the third ShapeID in the "mature" list. (so ready to pass it to DALEK if necessary). |

FIG. 18

| DT Interface | GCRA RAM | MINT RAM | LINK RAM | Notes |
|---|---|---|---|---|
| | Read GCRA for CPU | | | Read MCI and state information. |
| | | | | A read associated with the Schedule Sequence can occur here, in which case the Management write below is nullified. |
| | Read GCRA for CPU | | | Write new MCI and state information. (Write Request only) |

FIG. 19

| T state | DT Interface | GCRA RAM | MINT RAM | LINK RAM | Notes |
|---|---|---|---|---|---|
| 6 | cid-error | | | | |
| 7 | SID A | Read GCRA for CPU | | | Start GR_WRREQ processing. |
| 8 | SID A | | | | |
| 9 | later_count | Read GCRA A | Read Head/Tail | | Start Scheduling SID A from DALEK Start Mature Sequence |
| 10 | now_count | | | | |
| 11 | | Write GCRA for CPU | | | |
| 12 | SID B | | | | End of GR_WRREQ processing. |
| 13 | SID B | | | | |
| 14 | dalek_sig1 | Read GCRA B | Write null Head/Tail | Write Link from old Tail | Start Scheduling SID B from DALEK |
| 15 | dalek_sig0 | | | | |
| 16 | dti_test | Write GCRA A | Read A Head/Tail | Read 2nd ShapeID in list | |
| 17 | SID C | | | | |
| 18 | high-Z | | | | |
| 19 | SID X | Read GCRA C | Write A Head/Tail | Write Link to A Tail | Scheduling of SID A completed. Start Scheduling SID C from DALEK |
| 20 | SID X | | | | |
| 21 | | Write GCRA B | Read B Head/Tail | Read 3rd ShapeID in list | |
| 22 | | | | | |

FIG. 20A

| T state | DT Interface | GCRA RAM | MINT RAM | LINK RAM | Notes |
|---|---|---|---|---|---|
| 23 | | | | | |
| 24 | SID Y | Read GCRA for CPU | Write B Head/Tail | Write Link to B Tail | Scheduling of SID B completed. Start Scheduling SID I from "mature". |
| 25 | | | | | |
| 26 | | Write GCRA C | Read C Head/Tail | | |
| 27 | | | | | |
| 28 | | | | | |
| 29 | SID Z | Read GCRA J | Write C Head/Tail | Write Link to C Tail | Scheduling of SID C completed. Start Scheduling SID J from "mature". |
| 30 | | | | | |
| 31 | | Write GCRA I | Read I Head/Tail | | |
| 32 | | | | | |
| 33 | | | | | |
| 34 | config | Read GCRA K | Write I Head/Tail | Write Link to I Tail | Scheduling of SID I completed. Start Scheduling SID K from "mature". |
| 35 | cpu_wrsid | | | | |
| 36 | cpu_wrcid | Write GCRA J | Read J Head/Tail | | |
| 37 | dti_test | | | | |
| 1 | | | | | |
| 2 | high-Z | | Write J Head/Tail | Write Link to J Tail | Scheduling of SID J completed. |
| 3 | dti_test | | | | |
| 4 | status | Write GCRA K | Read K Head/Tail | | |
| 5 | cpu_rd_sid | | | | |
| 6 | cid-error | | | | |
| 7 | SID A | | Write K Head/Tail | Write Link to K Tail | Scheduling of SID J completed. |
| 8 | | | | | |

FIG. 20B

| CD Interface | SHAPE RAM | DATA BUFFER | COIN RAM | TARDIS Interface | Notes |
|---|---|---|---|---|---|
| | | | | | |
| CD valid | | | | | |
| | | | | | |
| | Read ShapeID | | | | |
| | | | | | DIS_RDY asserted. |
| | | Write CD with null Link (4 writes) | Read Old Head/Tail | ShapeID | Write CD to Data Buffer |
| | | | Write New Head/Tail | | Update Head/Tail |
| | | | | | |
| | | Write Link | | | Update Link |

FIG. 23

| CD Interface | SHAPE RAM | DATA BUFFER | COIN RAM | TARDIS Interface | Notes |
|---|---|---|---|---|---|
| | | | | ShapeID | |
| | | | Read Head of Priority 3 list | | Read "later" Heads. |
| | | | priority 2 | | |
| | | | priority 1 | | |
| | | | priority 0 | | |
| | | Read link in old "later" head | | | Get new "later" Head. |
| | | Write link in old "now" tail | Write new Head of Priority | | Save new Link & Head. |

FIG. 24

| CD Interface | SHAPE RAM | DATA BUFFER | COIN RAM | TARDIS Interface | Notes |
|---|---|---|---|---|---|
| | | | | | Get CD from BUFFER. |
| | | Read CD at head of "now" list (4 reads) | | | |
| | | | | | |
| | | | | | |
| | | | | | |
| | | | | | CD available for output. |
| ... Wait for output CD time in next Main Timing Sequence... | | | | | |
| Output CD | | | | | SHP_RDY asserted. |

FIG. 25

| CD Interface | SHAPE RAM | DATA BUFFER | COIN RAM | TARDIS Interface | Notes |
|---|---|---|---|---|---|
| | Write SID from CPU | | | | Write if cpu_wrreq=1 |
| | | | | | |
| | Read SID from CPU | | | | Read always occurs. |
| | | | | | |

FIG. 26

| T state | DT Interface | SHAPE RAM | DATA BUFFER | COIN RAM | TARDIS Interface | Notes |
|---|---|---|---|---|---|---|
| 37 | | | | | dti_test | cpu_sr_wrreq negated. |
| 1 | | | | | | |
| 2 | | Read SID for CPU | | | high-Z | DT_SYNC asserted. |
| 3 | CD A input | | | | dti_test | |
| 4 | CD A input | Read SID A | | | status | |
| 5 | CD A input | Read SID A | | | cpu_rd_sid | DIS_RDY asserted |
| 6 | | | Write CD A with null link | Read Old Head/Tail | cid_error | |
| 7 | | | Write CD A with null link | Read Old Head/Tail | SID A | |
| 8 | CD B input | | Write CD A with null link | Write New Head/Tail | SID A | |
| 9 | CD B input | Read SID B | Write CD A with null link | Write New Head/Tail | later_count | |
| 10 | CD B input | Read SID B | Write CD A with null link | | now_count | DIS_RDY asserted |
| 11 | | | Write Link | Read Old Head/Tail | | |
| 12 | | | Write CD B with null link | Read Old Head/Tail | SID B | |
| 13 | CD C input | | Write CD B with null link | Write New Head/Tail | SID B | |
| 14 | CD C input | Read SID C | Write CD B with null link | Write New Head/Tail | dalek-sig1 | |
| 15 | CD C input | Read SID C | Write CD B with null link | | dalek_sig0 | DIS_RDY asserted. |

FIG. 27A

| T state | CD Interface | SHAPE RAM | DATA BUFFER | COIN RAM | TARDIS Interface | Notes |
|---|---|---|---|---|---|---|
| 16 | | | Write Link | Read Old Head/Tail | dti_test | |
| 17 | | | Write CD C with null link | | SID D | |
| 18 | | | | Write New Head/Tail | high-Z | |
| 19 | | | | | SID X | |
| 20 | | | | Read Head Priority 3 | | |
| 21 | | | Write Link | | | |
| 22 | Output CD D | | | Priority 2 | | |
| 23 | | | Read CD at head of now list (4 reads) | Priority 1 | | |
| 24 | Data from previous MTS. | | | Priority 0 | SID Y | SHP_RDY asserted. |
| 25 | | | | Read Head Priority 3 | | |
| 26 | | | | | | |
| 27 | | | Read now Priority & Link in old later Head | Priority 2 | | |
| 28 | | | | Priority 1 | | |
| 29 | | | | Priority 0 | | |
| 30 | | | Write Link in old now Tail | Read Head Priority 3 | SID Z | |
| 31 | | | | | | |
| 32 | | | Read now Priority & Link in old later Head | Priority 2 | | |
| 33 | | | | Priority 1 | | |
| 34 | | | | Priority 0 | config | |
| 35 | | | Write Link in old now Tail | | cpu_wrsid | |
| 36 | | | | Write new Head of Priority | cpu_wrcid | |
| 37 | | Write SID from CPU | Read now Priority & Link in old later Head | | dti_test | cpu_sr_wrreq asserted. |
| 1 | | | | Write new Head of Priority | high-Z | |
| 2 | | Read SID for CPU | | | | |
| 3 | | | Write Link in old now Tail | Write new Head of Priority | dti_test | |
| 4 | | | | | status | |

FIG. 27B

APPARATUS AND METHOD FOR TRAFFIC SHAPING IN A NETWORK SWITCH

CROSS-REFERENCE TO RELATED APPLICATIONS

This application claims priority from U.S. Provisional Patent Application No. 60/136,953, entitled METHOD AND SYSTEM FOR CONGESTION CONTROL IN A CONNECTION ORIENTED COMPUTER NETWORK DEVICE, filed May 28, 1999; and is related to U.S. patent application Ser. No. 09/321,904, entitled BI-MODAL CONTROL SYSTEM AND METHOD FOR PARTITIONING A SHARED OUTPUT BUFFER IN A CONNECTION-ORIENTED NETWORK CONNECTIONS DEVICE, filed May 28, 1999, now U.S. Pat. No. 6,466,579; and is also related to U.S. patent application Ser. No. 09/505,075, entitled FAIR DISCARD SYSTEM, filed Feb. 16, 2000, the disclosure of which are herein incorporated by reference.

BACKGROUND OF THE INVENTION

1. Field of the Invention

The present invention relates generally to the field of network communications, and more particularly to an apparatus and method for traffic shaping in a network switch.

2. Description of the Related Art

In general, network communication systems interconnect many users in a network. Each user is connected to the network through a port. The network is formed by the interconnection of many nodes, whereby information input at an input port from one user at a source is passed from node to node through the network to an output port and to another user at a destination. The information transferred from source to destination is packetized and each node switches incoming packets at incoming ports to outgoing packets at outgoing ports. For ATM (Asynchronous Transfer Mode) networks, the packets are further divided into cells.

Using current technology, fast packet switches transfer hundreds of thousands of packets per second at every switch port. Each switch port is typically designed to transfer information at a rate from 50 Mbit/s to 2.4 Gbit/s for a broadband integrated service digital network (BISDN). Switch sizes range from a few ports to thousands of ports.

The term "fast packet switch" includes switches capable of handling both variable length packets and fixed length packets. Use of fixed-length packets can simplify the switch design. Fast packet switches using short, fixed-length packets (cells) are referred to as ATM switches. Fast packet switches handle different types of communications services in a single integrated network where such services may include voice, video and data communications. Since voice and video services can tolerate only a limited amount of delay and delay variance through a network, ATM switches are suitable for such services. The ATM standard for broadband ISDN networks defines a cell having a length of 53 bytes with a header of 5 bytes and data of 48 bytes. The ATM Forum Traffic Management Specification has specified a number of Service Class Definitions as follows:

CBR: Continuous Bit Rate. For real-time applications requiring tightly constrained delay and delay variation such as voice and video. The CBR service class requires the consistent availability of a fixed quantity of bandwidth.

RT-VBR: Realtime Variable Bit Rate. For applications where sources transmit at a rate which varies with time (referred to in the art as "bursty"), yet still must receive service with tightly constrained delay and delay variation.

NRT-VBR: Non-Realtime Variable Bit Rate. For bursty applications, having no service requirements related to delay or its variance, but having sensitivity to loss.

UBR: Unspecified Bit Rate. For non-real-time applications, such as file transfer and e-mail, that transmit non-continuous bursts of cells without related service guarantees and therefore without allocated bandwidth resource, without guarantee as to cell loss ratio or cell transfer delay, and without explicit feedback regarding current level of network congestion.

GFR: Guaranteed Frame Rate. Also for non-real-time applications, this service category provides loss guarantees for sources transmitting traffic at or below a contracted minimum rate. Once a source exceeds the contracted minimum rate, traffic above that rate does not receive any loss guarantees.

ABR: Available Bit Rate. For non-real-time applications that permit variation in information transfer rate depending on the amount of bandwidth available in the network.

In a typical ATM switch, the cell processing functions are performed within the nodes of a network. Each node is an ATM switch which includes input controllers (IC's), a switch fabric (SF), output controllers (OC's) and a node control (C). The node control is used for functions including connection establishment and release, bandwidth reservation, buffering control, congestion control, maintenance and network management.

In each switch, the input controllers are typically synchronized so that all cells from input controllers arrive at the switch fabric at the same time and cells can be accepted or rejected according to their priority. The traffic through the switch fabric is slotted and the switch fabric delay equals the sum of the timeslot duration, pipeline delay and the queuing delay.

The node control communicates with the input controllers and the output controllers either by a direct communication path which by-passes the switch fabric or via control cells transmitted through the switch fabric.

External connections to the switch are generally bi-directional. Bi-directional connections are formed by grouping an input controller (IC) and an output controller (OC) together to form a port controller (PC).

The input sequence of cells in a virtual channel is preserved across the switch fabric so that the output sequence of cells on each virtual channel is the same as the input sequence. Cells contain a virtual channel identifier (VCI) in the cell header which identifies the connection to which the cell belongs. Each incoming VCI in the header of each cell is translated in an input controller to specify the outgoing VCI identifier. This translation is performed in the input controller typically by table look-up using the incoming VCI to address a connection table. This connection table also contains a routing field to specify the output port of the switch fabric to which the connection is routed. Other information may be included in the connection table on a per connection basis such as the priority, class of service, and traffic type of the connection.

In an ATM switch, cell arrivals are not scheduled. In a typical operation, a number of cells may arrive simultaneously at different input ports, each requesting the same output port. Operations in which requests exceed the output capacity of the output port are referred to as output contention. Since an output port can only transmit a fixed number (for example, one) cell at a time, only the fixed number of cells can be accepted for transmission so that any other cells routed to that port must either be discarded or must be buffered in a queue. Different methods are employed for routing cells through a switch module, for example, self-routing and label routing.

A self-routing network operates with an input controller prefixing a routing tag to every cell. Typically, the input controller uses a table look-up from a routing table to obtain the routing tag. The routing tag specifies the output port to which the cell is to be delivered. Each switching element is able to make a fast routing decision by inspecting the routing tag. The self-routing network ensures that each cell will arrive at the required destination regardless of the switch port at which it enters.

A label routing network operates with a label in each cell referencing translation tables in each switching element. The label is translated in each switching element and hence any arbitrary network of switching elements may be employed.

Switches have two principal designs, time-division and space division. In a time-division switch fabric, all cells flow through a single communication channel shared in common by all input and output ports. In a space division switch, a plurality of paths are provided between the input and output ports. These paths operate concurrently so that many cells may be transmitted across the switch fabric at the same time. The total capacity of the switch fabric is thus the product of the bandwidth of each path and the average number of paths that can transmit a cell concurrently.

When the traffic load exceeds the available system resources in a network, congestion is present and performance degrades. When the number of cells is within the carrying capacity of the network, all cells can be delivered so that the number of cells delivered equals the number of cells sent without congestion. However, if cell traffic is increased to the level that nodes cannot handle the traffic, congestion results.

Congestion can be brought about by several factors. If nodes in a network are too slow to perform the various tasks required of them (queuing buffers, updating tables, etc.), queues build up, even though excess line capacity exists. On the other hand, even if nodes are infinitely fast, queues will build up whenever the input traffic rate exceeds the capacity of the output traffic rate for any particular group of outputs.

If a node has no free buffers for queuing cells, the node must discard newly arriving cells. For packet data traffic, when a cell is discarded, the packet from which the discarded cell came will be retransmitted, perhaps many times, further extending the congestion epoch.

In an ATM switch, in order to guarantee a certain service rate, the flow of incoming data needs to be predictable, thereby allowing a designer to provide adequate buffer space. One problem which arises is that the cells do not arrive with a uniform distribution. In fact, most traffic arrives in "bursts"—with a cell group, having a random size, transmitted in between delays of random duration. In order to provide for a more predictable data stream, the cell bursts are shaped by a device known in the art as a "shaper." The shaper takes the cell bursts and distributes the cells evenly, according to a predefined "shape." Different virtual channels (VCs) may require different shapes, and therefore it would be desirable to have a shaper that shapes each VC independently.

SUMMARY OF THE INVENTION

In general, the present invention is an apparatus and method for traffic shaping in a network switch, which provides for per-connection shaping. A shaper according to the present invention comprises two functional blocks: a Cell Descriptor (CD) processing block, and a ShapeID processing block. The CD processing block and the ShapeID processing block operate to de-couple the management of the CDs from the scheduling of the CD output times. The CD-processing block outputs a token (ShapeID) to the ShapeID block. If the token is conforming, it is immediately passed back to the CD-processing block, otherwise it is processed. When the token is "mature" the token is passed back to the CD-processing block. The CD processing block then outputs a CD.

Use of "now" and "later" lists with per-connection ShapeIDs provides priority within a virtual connection (VC) and a virtual path (VP), respectively. This effectively preserves the relative priority for connections being shaped within a VP. In other words, a higher priority VC may be sent first, even if it did not generate the token, thus preserving cell priority. Also, the use of a Calendar Queue reduces the complexity of a "virtual finishing time" (VFT) calculation.

BRIEF DESCRIPTION OF THE DRAWINGS

The present invention will be readily understood by the following detailed description in conjunction with the accompanying drawings, wherein like reference numerals designate like structural elements, and in which:

FIG. 12 is a diagram of a "mature" linked list of ShapeIDs;

FIG. 13 is a table of the minimum and maximum cell intervals according to one embodiment of the present invention;

FIG. 14 is a table of examples of minimum cell intervals;

FIG. 15 is a truth table for the scheduling operation;

FIG. 16 is a truth table of the Calendar Queue insertion time calculation;

FIG. 17 illustrates the schedule sequence for scheduling a ShapeID;

FIG. 18 illustrates the operation of the "mature" sequence for the ShapeID processing block;

FIG. 19 illustrates the operation of the management sequence of the ShapeID processing block;

FIG. 20 illustrates an example of an overall sequence performed by the ShapeID processing block;

FIG. 23 illustrates the operation of the receive sequence for the CD-processing block;

FIG. 24 illustrates the operation of the transfer sequence for the CD-processing block;

FIG. 25 illustrates the operation of the transmit sequence for the CD-processing block;

FIG. 26 illustrates the operation of the management sequence for the CD-processing block; and FIG. 27 illustrates an example of an overall sequence performed by the CD-processing block.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide an apparatus and method for traffic shaping in a network switch. Any and all such modifications, equivalents and alternatives are intended to fall within the spirit and scope of the present invention.

Figure 1:
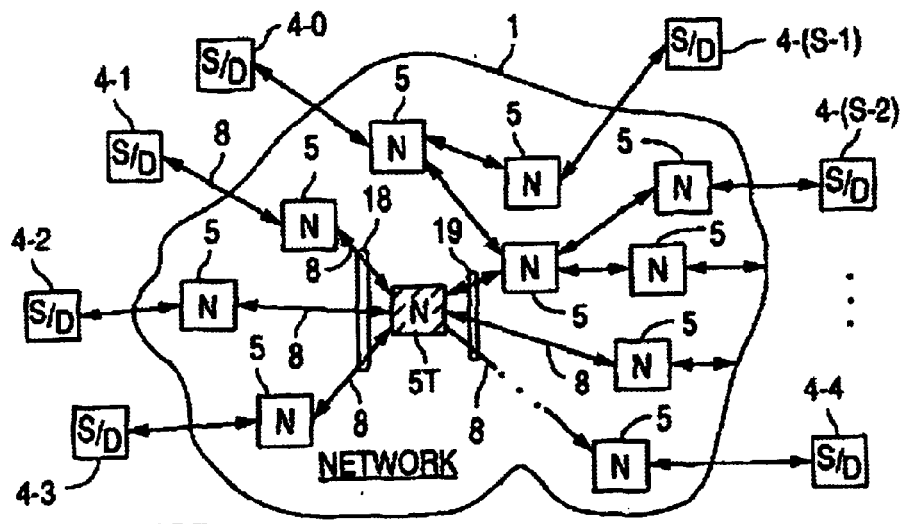
FIG. 1 is a schematic block diagram of a plurality of source/destination (S/D) users connected through a multi-node network.

Referring first to FIG. 1, a plurality of network users are represented as the source/destination (S/D) 4. Each user typically sends information as a source (S) and receives information as a destination (D). The source (S) of an S/D unit 4 will send information to the destination (D) of some other S/D unit 4. In order for information to be transferred from a source to a destination, each S/D unit 4 connects through a multi-node (N) network 1. The network 1 includes many nodes (N) 5. The nodes are connected from node to node so that, in general, any particular one of the S/D units 4 can connect to any one of the other S/D units 4 by forming a chain of nodes 5 in the network 1. In general, the connections between the S/D units 4 and a node 5, and the connections between nodes 5, are by bi-directional links 8 which enable information to be transferred in both directions.

In FIG. 1, the number of nodes (N) 5 shown is for clarity a relatively small number, but the network may include hundreds or more of nodes. Also, the S/D units 4 include S users 4-0, 4-1, 4-2, 4-3, 4-4, ..., 4-(S-2), 4-(S-1). The value of S can be any integer, although S is typically equal to hundreds or higher.

In a typical embodiment, the FIG. 1 communication system is an ATM network in which the unit of transfer of information is a cell. A plurality of cells form packets of information. The network I communicates cells and packets so as to support different types of information including images, voice and data.

Figure 2:
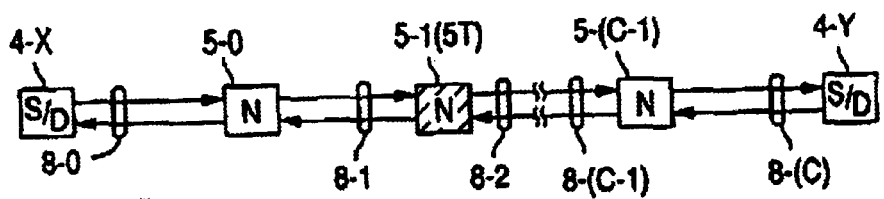
FIG. 2 is a schematic representation of a circuit with one S/D user connected to another S/D user through a sequence of nodes in the network of FIG. 1.

In FIG. 2, the S/D unit 4-x connects through a plurality C of nodes (N) 5-0, 5-1 ... 5-(C-1) to the S/D unit 4-y. The S/D unit 4-x is typical of any of the S/D units 4 of FIG. 1. For example, the S/D unit 4-x may represent the S/D unit 4-2 in FIG. 1. Similarly, the S/D unit 4-y in FIG. 2 may represent any of the S/D units 4 in FIG. 1. For example, S/D unit 4-y may represent the S/D unit 4-4 in FIG. 1. In such an example, the nodes 5-0, 5-1, ..., 5-(C-1) represent the C nodes in the network 1 of FIG. 1 which are used to connect the S/D unit 4-2 to the S/D unit 4-4.

In FIG. 2, the bi-directional links 8-0, 8-1, ..., 8-(C-1), 8-(C) connect from the S/D unit 4-x through the nodes 5-0, 5-1, ..., 5-(C-1) to the S/D unit 4-y. In FIG. 2, information may be transferred from the source (S) in the S/D unit 4-x to the destination (D) in the S/D unit 4-y. Similarly, information from the source (S) in the S/D unit 4-y can be transferred to the destination (D) in the S/D unit 4-x. While information may be transferred in either direction in FIG. 2, it is convenient, for purposes of explanation to consider transfers between a source (S) and a destination (D), whether that be from the S/D unit 4-x to the S/D unit 4-y or from the S/D unit 4-y to the S/D unit 4-x. Regardless of the direction, each transfer is from a source (S) to a destination (D).

Figure 3:
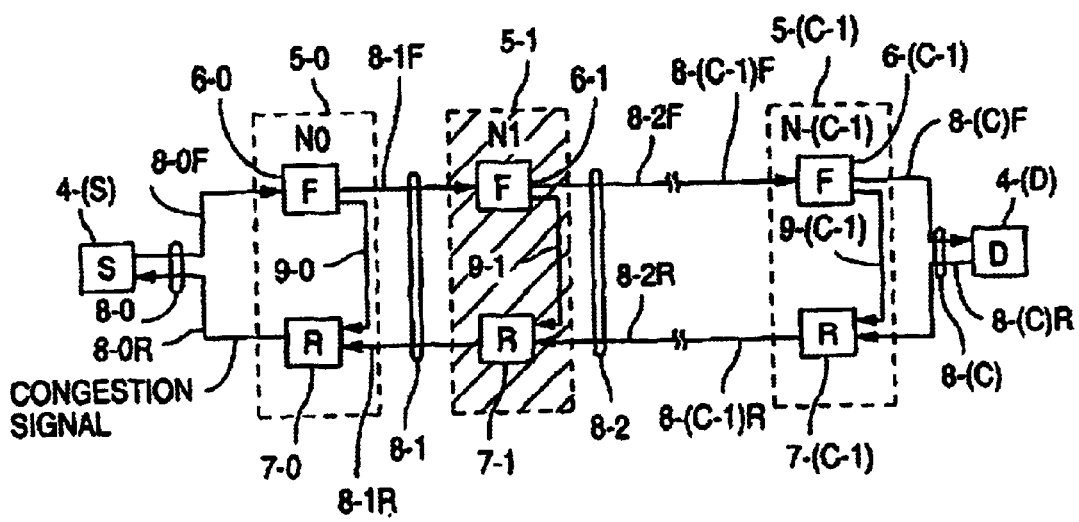
FIG. 3 is a schematic representation of the FIG. 2 circuit with a virtual channel connection of the source (S) sending information in a forward direction (F) to a destination (D) and with a reverse direction (R) for transmitting control signals to the source (S)

In FIG. 3, a schematic representation of the circuitry used for a source (S) to destination (D) transfer in the virtual channel of FIG. 2 is shown. In FIG. 3, the source unit 4-(S) in the S/D unit 4-x of FIG. 2 connects to the destination unit 4-(D) in the SID unit 4-y of FIG. 2.

In FIG. 3, each of the links 8-0, 8-1, ..., 8-(C-1), 8-(C) includes a forward (F) channel for transferring information in the forward direction and a reverse (R) channel for transferring information in the reverse direction. The forward channel in FIG. 3 is associated with the transfer of information from the source unit 4-(S) to the destination unit 4-(D). The reverse channel in FIG. 3 is for the purpose of sending control information used in connection with the network of FIG. 1. The reverse channel (R) is distinguished from the forward channel (F) used for the transfer of information in the forward direction from S/D unit 4-y to S/D unit 4-x, as discussed in connection with FIG. 2. Both the forward (F) and the reverse (R) channels are associated with the source unit 4-(S) transfer to the destination unit 4-(D). Each of the nodes in FIG. 3 includes forward (F) circuitry 6 and reverse (R) circuitry 7. In FIG. 3, the forward channels 8-OP, 8-IF, ..., 8-(C-1)F connect as inputs respectively to the forward circuits 6-0, 6-1, ..., 6-(C-1). The forward channel 8-(C)F connects from the node 6-(C-1) to the D unit 4-(D). Similarly, the reverse channels 8-OR, 8-1R, ..., 8-(C-1)R connect from the reverse circuits 7-0, 7-1, ..., 7-(C-1). The reverse channel 8-(C)R connects from the D unit 4-(D) to the reverse circuit 7-(C-1).

In FIG. 3, each of the nodes 5 has a feedback connection 9 connecting from the forward (F) circuit 6 to the reverse (R) circuit 7. Specifically, the feedback channels 9-0, 9-1, 9-(C-1) connect from the forward (F) circuits 6 to the reverse (R) circuits 7 in the node 5-0, 5-1, ..., 5-(C-1), respectively. In the FIG. 3 circuit, a virtual channel connection is made along the forward channel setting up a communication path in the forward direction between the S unit 4-(S) and the D unit 4-(D). Because other virtual channels are also established in the network 1 of FIG. 1, buffering is required at each node and destination including the nodes of FIG. 3.

Figure 4:
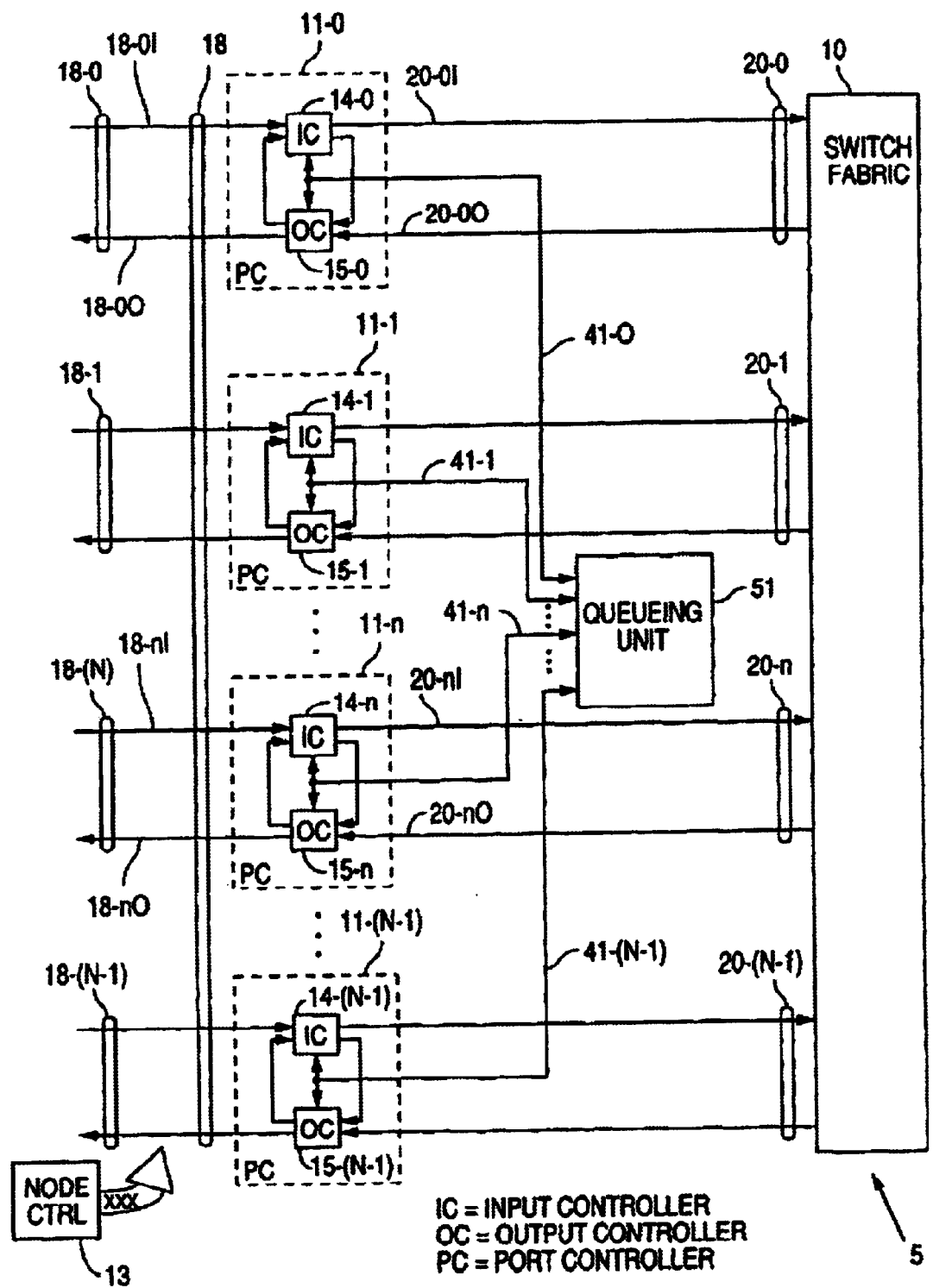
FIG. 4 is a schematic representation of a typical one of the nodes (N) in the FIG. 1 network.

In FIG. 4, one typical embodiment of a node having the signal paths of FIG. 3 is shown. In FIG. 4, the node 5 includes N links 18-0, 18-1, ..., 18-n, ... 18-(N-1). Each of the links 18 of FIG. 4 are analogous to the bi-directional links 8 of FIG. 2. In FIG. 4, the links 18-0, 18-1, ..., 18-n, ..., 18-(N-1) connect to port controllers 11-0, 11-1, ..., 11-n, ..., 11-(N-I).

The node of FIG. 4 is used in connection with the information transfer of FIG. 3, for example, by having one of the links 18, for example, input link 18-0 in FIG. 4, connect through switch fabric 10 to another one of the links 18, for example, link 18-n. In the example described, the switch fabric 10 functions to connect the link 18-0 to the link 18-n.

In an example where the node of FIG. 4 represents the node 5-1 in FIG. 2, the link 8-1 in FIG. 2 is the link 18-0 in FIG. 4 and the link 8-2 in FIG. 2 is the link 18-n in FIG. 4. With such a connection, the node of FIG. 4 connects information in one direction, for example, from link 18-0 to link 18-n, and connects information in the opposite direction from the link 18-n to the link 18-0. The links 18-0 and 18-n were arbitrarily selected for purposes of explanation. Any of the N links 18 might have been selected in the FIG. 2 circuit for connection to any of the other links 18.

When the node of FIG. 4 is used in the virtual channel connection of FIG. 3 with the source (S) on the left and the destination (D) on the right, then for purposes of explanation it is assumed that the link 18-0 is an input to the node 5 in the forward direction and the link 18-n is output from the node in the forward direction.

In FIG. 4, port controllers (PC) 11-0, 11-1, ..., 11-n, ..., 11-(N-1) have input controllers 14-0, 14-1, ..., 14-n, ..., 14-(N-1), respectively and have output controllers (OC) 15-0, 15-1, ... 15-n, ..., 15-(N-1), respectively. In FIG. 4, forward information cells from the source 4-S of FIG. 3 sent to the destination 4-(D) of FIG. 3 connect from the bus 18-01 through the input controller 14-0 to the bus 20-nO through the switch fabric 10 to the bus 20-nl through the controller 15-n to the bus 18-nO. The port controllers share a common buffer storage located in shared queuing unit 51 and are bi-directionally connected to unit 51 over buses 41-0, 41-41-n, ..., 41-(N-1).

Figure 5:
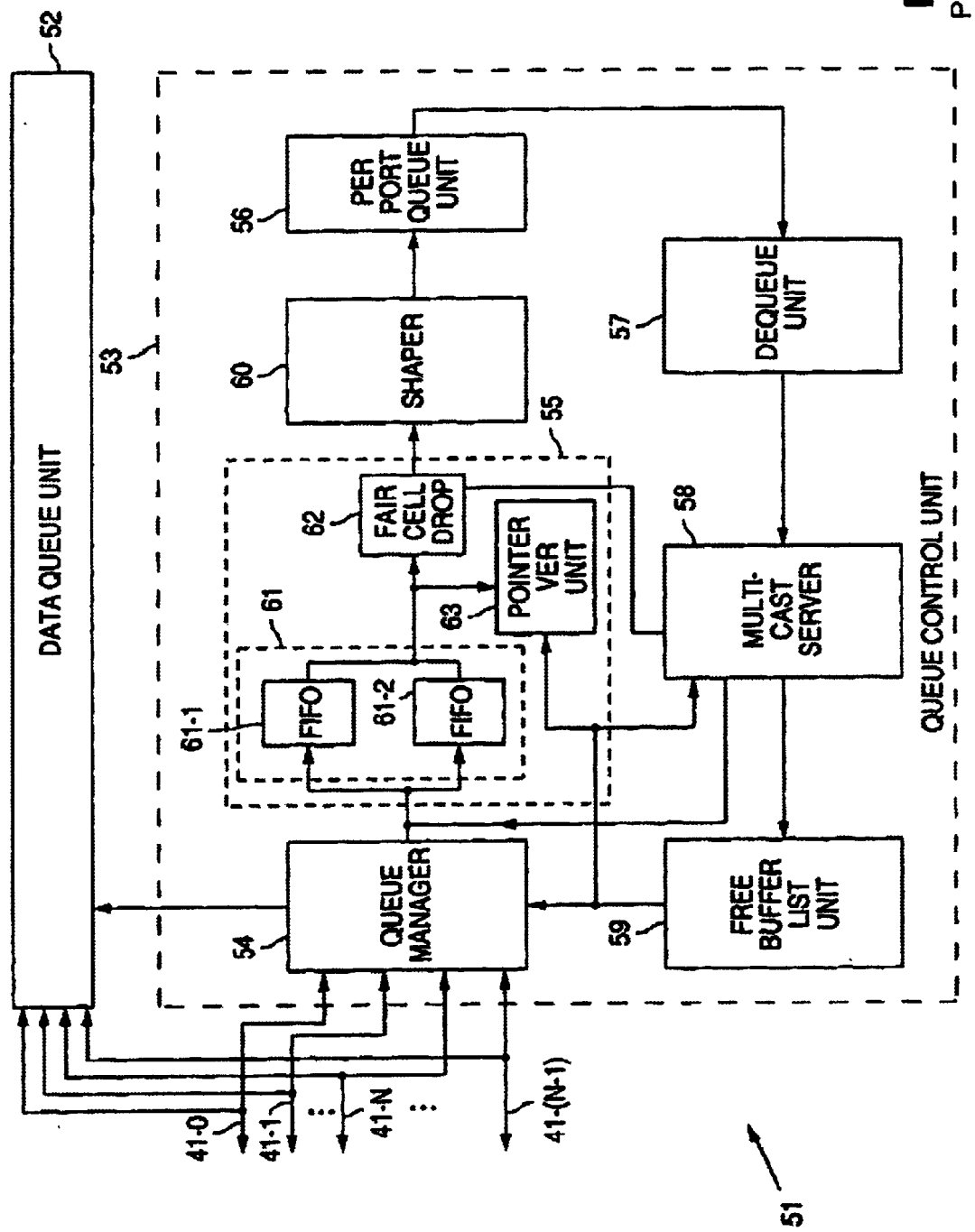
FIG. 5 is a schematic representation of the queuing unit in the FIG. 4 node.

In FIG. 5, the queuing unit 51 of FIG. 4 is shown in greater detail. The queuing unit 51 includes a data queue unit 52 and a queue control unit 53. The data queue unit 52 and the queue control unit 53 each connect to the bi-directional buses 41-0, 41-1, ..., 41-n ... 41-(N-1). The control information on the buses 41 connect to the queue control unit 53 and the data on the buses 41 connect to the data queue unit 52.

In FIG. 5, the queue control unit 53 includes a queue manager 54 which controls data queue unit 52 and the overall operation of the queuing unit 51. The queue manager typically includes a processing unit capable of executing software. Upon detection that input information on the buses 41 requires storage in the data queue unit 52, the queue manager 54 detects an available buffer location from the free buffer list unit 59 and assigns the available data location in the data queue unit 52. The general function and operation of queue managers are well known. In addition to queuing, and in order to operate with the methods of the present invention, certain cells may need to be discarded from time to time to promote efficient operation of the overall communication network. The discard unit 55 under control of the queue manager 54 determines when to discard queue assignments previously allocated. A shaper block 60 "re-shapes" the cells, which usually arrive in bursts, and evenly spaces out the cells, as illustrated in FIG. 6. The results of the queuing operation are stored in the per port queue unit 56, which in turn activates the de-queue unit 57, which in turn operates through the multicast server 58 to remove buffer locations that have been previously allocated. Once removed, the de-queued buffer locations are added back to the free buffer list in the unit 59 and are available for reassignment.

The discard unit 55 comprises three units: FIFO unit 61 (including sub-units 61-1 and 61-2), discard unit 62, and pointer integrity unit 63. Discard unit 55 is responsible for:

1. Guaranteeing the contracted Quality of Service (QoS) of all the connections (by discarding non-conforming cells).
2. Surveillance and control of buffer congestion.
3. Performing Explicit Forward Congestion Indication (EFCI) tagging in the ATM header when the buffer starts to become congested.
4. Performing a per connection cell and frame discard when the congestion becomes excessive.
5. Insuring fairness between the non-guaranteed connections (ABR, GFR, and UBR).
6. Providing different quality for ABR, GFR, and UBR traffic, by supporting various EFCI and discard thresholds.
7. Pointer integrity verification (verify that no pointer duplication occurs).

Figures 6A, 6B, 7:
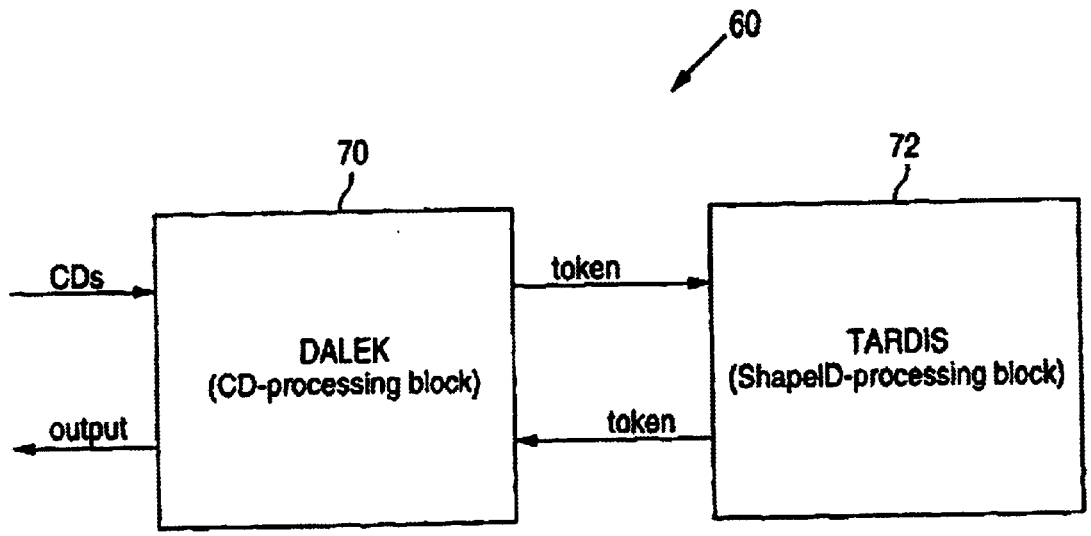
FIG. 6(A) is an illustration of cell traffic, with each cell spaced 1 ms apart, and "bursts" of traffic randomly spaced.
FIG. 6(B) is an illustration of the cell traffic of FIG. 6(A) after the cells have been "shaped" with a uniform spacing of 3 ms.
FIG. 7 is a block diagram of the functional blocks of a shaper configured according to the present invention.

As mentioned above, the shaper block 60, spaces out cell bursts, and evenly distributes the cells. FIG. 6(A) illustrates a sample transmission stream having cells spaced 1 ms apart that are bunched together in groups known as bursts, with irregular delays between bursts. A shaper takes the cell bursts and evenly distributes the cells, such that the cells are transmitted in even 3 ms intervals, as shown in FIG. 6(B).

In general, as shown in FIG. 7, a shaper 60 configured according to the present invention comprises two functional blocks: a Cell Descriptor (CD)-processing block 70, and a ShapeID-processing block 72. The functional blocks may be implemented as separate ASICs, or on the same chip. As described herein, the CD-processing block 70 is referred to as the DALEK 70 and the ShapeID-processing block 72 is referred to as the TARDIS 72. A Cell Descriptor (CD), as is known in the art, is a descriptor representing each cell. The CD for each cell is routed through the control path, instead of each cell, in order to provide more efficient processing. Once the discard subsystem 55 and shaper 60 process the CD, the corresponding cell is output from memory. An example of a CD format is shown in FIG. 8.

The DALEK 70 stores the CDs and generates a token (ShapeID). The ShapeID is basically a pre-defined "shape" that specifies the rate that the cells can be transmitted. In operation, the shaper of the present invention allows a user to specify the shaped cell rates, or the user can defer the decision to software control. A token is output from the DALEK 70 to the TARDIS 72. The TARDIS 72 processes the ShapeID, and returns a token to the DALEK 70, which in turn outputs the appropriate CD, as described in further detail below.

From the connection identifier (ConnectionID) in the CD for each cell, the DALEK 70 determines the appropriate ShapeID. The TARDIS 72 contains tables that specify for each unique ShapeID, minimum time interval between cells. When a token "matures" (i.e. a cell can go out for a specific connection), a token is sent back to the DALEK 70. The DALEK then determines exactly which VC has priority, and sends out a cell. Thus, a cell on a higher priority VC gets sent, even if it did not originally generate the token. The present invention allows a specific connection to be shaped independently of other connections. Also, numerous different connections may be shaped according to the same ShapeID. High and low priority traffic can thus be sent in the same physical connection.

Figures 8, 9:
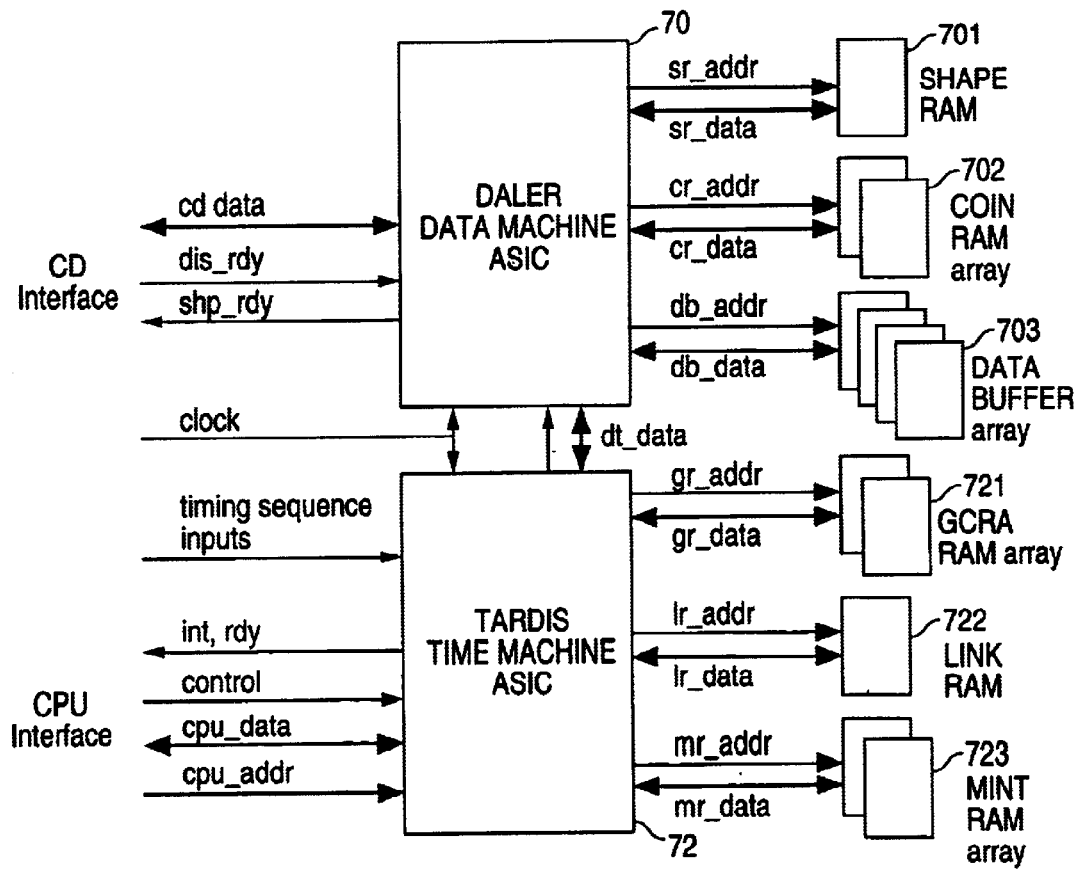
FIG. 8 is an example of a Cell Descriptor (CD) format.
FIG. 9 is a block diagram of one implementation of a shaper configured according to the present invention.

FIG. 9 is a more detailed block diagram of one implementation of the present invention. The DALEK 70 utilizes three separate memory arrays: a SHAPE RAM 701, a COIN RAM 702, and a DATA BUFFER 703. Similarly, the TARDIS interacts with three arrays: a GCRA (Generic Cell-Rate Algorithm) RAM 721, a LINK RAM 722, and a MINT RAM 723. The DALEK 70 and the TARDIS 72, together with their associated RAM arrays, implement the complete logic functionality of the shaper 60.

The relationship between the TARDIS 72 and DALEK 70 is one of master and slave, respectively. The TARDIS 72 controls the interface connecting the two blocks, and provides Main Timing Sequence signals to the DALEK 70. Interaction involves ShapeIDs and management data. ShapeIDs are exchanged between TARDIS 72 and DALEK 70, de-coupling the management of CDs from the scheduling of CD output times. The former is the responsibility of the DALEK 70, while the latter is the responsibility of the TARDIS 72. Up to six ShapeIDs may pass between DALEK 70 and TARDIS 72 in each Main Timing Sequence—three in each direction.

The DALEK 70 is managed by an external CPU, via the TARDIS 72. The TARDIS 72 reads all DALEK 70 read registers once every Main Timing Sequence, keeping local copies which may be read by the CPU. Similarly, CPU write data intended for the DALEK 70 is transferred from the TARDIS 72 to the DALEK 70 within one Main Timing Sequence of arrival from the CPU. Some bits of the DALEK 70 Status Register can assert the Interrupt output of the TARDIS 72. Each such interrupt source is individually enabled. All event flags transferred from the DALEK 70 to the TARDIS 72 are captured and held until read by the CPU. Communication between the DALEK 70 and TARDIS 72 is accomplished using a shared data bus plus control signals. Both ShapeID and management data share the same bus. Time division multiplexing based on the Main Timing Sequence ensures the necessary timing and bandwidth for transfer of all required data.

TARDIS block

Figure 10:
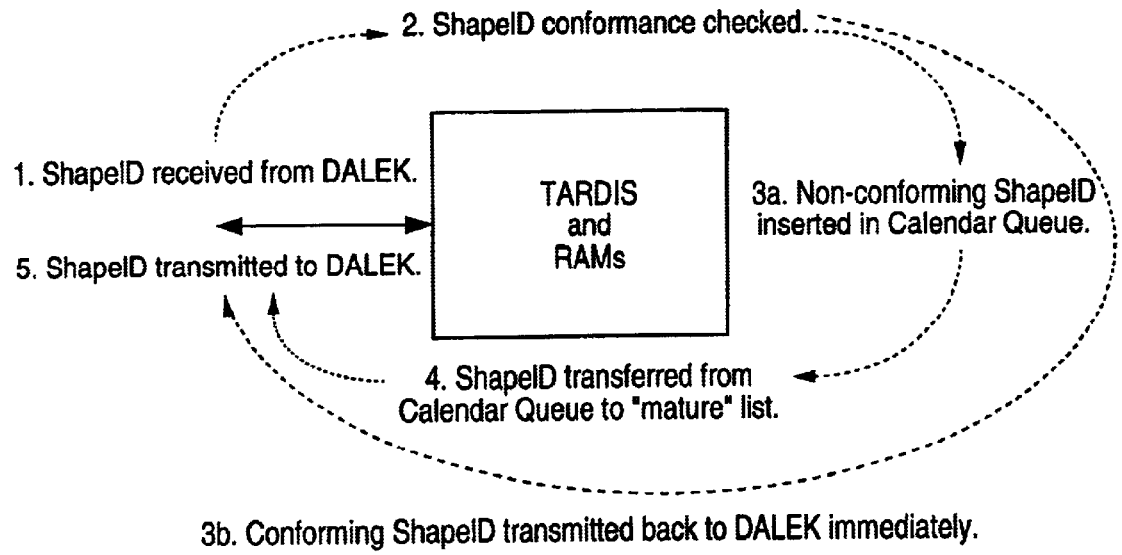
FIG. 10 is a diagram illustrating the data flow of the ShapeID through the ShapeID processing block.

FIG. 10 is a block diagram of the TARDIS 72 (and associated RAMs) illustrating the data flow of the ShapeID tokens through the block. First, the ShapeID token is received from the DALEK 70, and its conformance is checked. A conforming ShapeID token is transmitted immediately back to the DALEK 70, whereas a non-conforming ShapeID token is inserted in the Calendar Queue. The ShapeID token is transferred from the Calendar Queue to the "mature" list, and then the ShapeID token is transmitted to the DALEK 70. The TARDIS 72 operates using sequences synchronized (described below) to a Main Timing Sequence, and provides sequence synchronization to the DALEK 70. Data structures managed by the TARDIS 72 include a set of GCRA configuration and state data, a Calendar Queue linked list array of scheduled ShapeIDs and a "mature" linked list of ShapeIDs queued for immediate output to the DALEK 70.

The per-shape GCRA configuration and state data is maintained by the TARDIS 72 in the GCRA RAM 721. Configuration data includes the Minimum Cell Interval, defining the rate of the shape. State data includes Schedule Time and Count fields. Schedule Time is the output time of next ShapeID token. Count is the number of ShapeID tokens currently resident in the TARDIS 72. The Minimum Cell Interval is accessible from the main CPU. The GCRA data is used to schedule output times of ShapeID tokens up to six times in each Main Timing Sequence. Some scheduled ShapeIDs (as described below) are inserted into the Calendar Queue, while others are held in the Count field of the shape.

The Calendar Queue linked list array is maintained by the TARDIS 72 in the MINT RAM 723 and LINK RAM 722. This structure is an array of 64K linked lists, one for each Calendar Time. Implementing the Calendar Queue as an array of linked lists allows ShapeID tokens on multiple shapes to be scheduled at the same time. The MINT RAM 723 holds the heads and tails of the linked lists. Each scheduled ShapeID token is usually appended to the Calendar Queue list for the calculated Schedule Time. Under some circumstances the ShapeID is appended to the list for the Current Time plus one.

In each Main Timing Sequence the Calendar Time is advanced. The Calendar Queue list for the new Current Time is transferred to the tail of the "mature" linked list. In this way, Calendar Queue lists for "old" Calendar Times are automatically emptied. The "mature" linked list is maintained by the TARDIS 72 using internal logic and the LINK RAM 722. This structure is a single linked list of ShapeIDs queued for immediate output to the DALEK 70.

Figure 11:
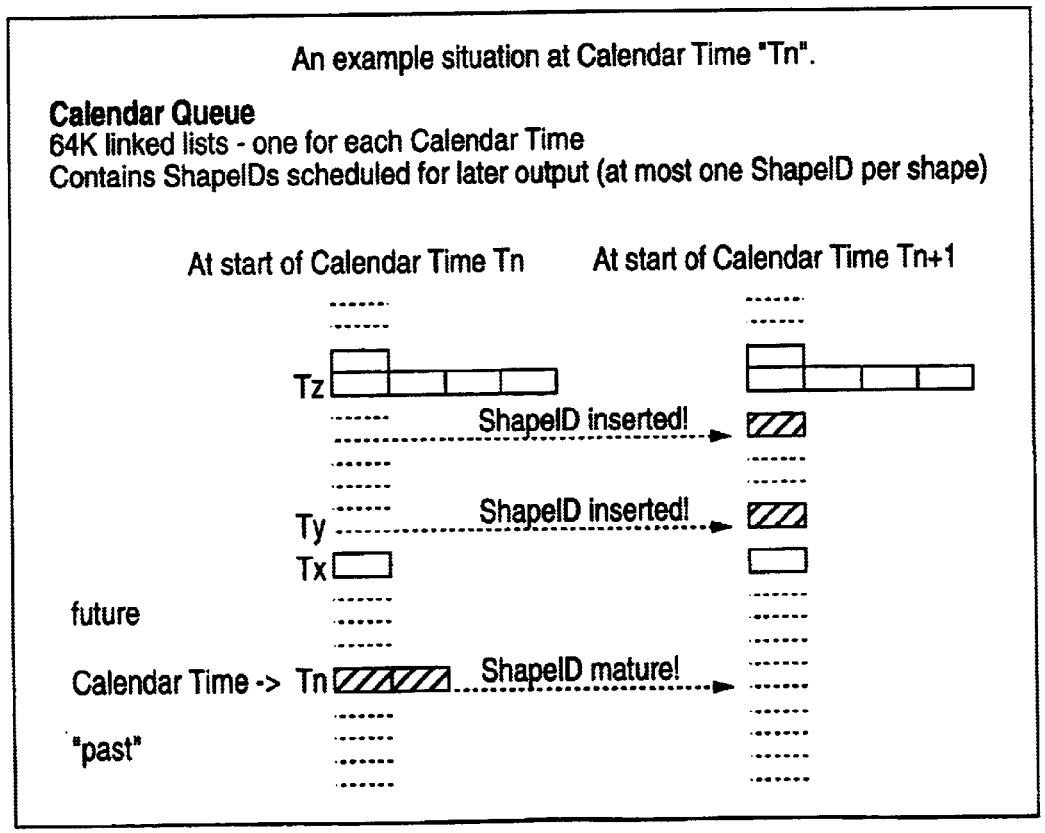
FIG. 11 is a diagram of a Calendar Queue configured according to the present invention.

Up to three ShapeID tokens can be transferred to the DALEK 70 in each Main Timing Sequence. Precedence is given to conforming ShapeID tokens received in the Sequence, then ShapeID tokens from the "mature" linked list. This ensures congestion has minimum impact on conforming cell streams. The links for the Calendar Queue and "mature" linked lists both use the LINK RAM 722. Since only a single ShapeID token from each shape may be scheduled—i.e. present in either of the list structures, only 16K links are needed. The address of the LINK RAM 722 is the ShapeID and the data returned is the next ShapeID token in the same list. FIG. 11 illustrates the Calendar Queue and FIG. 12 shows the "mature" linked list structure.

In the TARDIS 72, time is represented in a 16-bit binary field, giving a resolution of one Main Timing Sequence and a range of 64K Main Timing Sequences. Current Time increments once at the start of every Main Timing Sequence. The Minimum Cell Intervals are represented in a 24-bit binary field, giving a resolution of $1/256$th of a Main Timing Sequence and a range of 64K Main Timing Sequences. The 16 most significant bits of an interval are known as the "integer part." The 8 least significant bits of an interval are known as the "fractional part." The Peak Cell Rate (PCR) of each shape is defined in terms of the Minimum Cell Interval, which is the inverse of the rate. The minimum and maximum allowed rates are given in the table of FIG. 13.

The high bandwidth limit is not enforced by the TARDIS 72. ShapeIDs with higher bandwidth (i.e. smaller Minimum Cell Intervals) are therefore not guaranteed to be shaped correctly. Such ShapeIDs are likely to suffer significant cell delay variation in the presence of other shaped connections due to the limited output bandwidth of the shaper 60. The low bandwidth limit is enforced by the TARDIS 72. A ShapeID configured with Minimum Cell Interval greater than the limit is not shaped (i.e. it is treated as if its Minimum Cell Interval is 0001:00). FIG. 14 shows examples of Minimum Cell Intervals that can be configured in the TARDIS 72, according to one embodiment of the present invention.

Scheduling in the TARDIS 72 is carried out when:
1. ShapeID token received from the DALEK 70 (up to three in a Main Timing Sequence).
2. ShapeID token at head of "mature" list is transmitted to the DALEK 70. (up to three in a Main Timing Sequence).

FIG. 15 is a truth table for the scheduling operation. In the following discussion of the table it should be noted that the ShapeID tokens mentioned belong to a single shape. The 16K shapes supported by the TARDIS 72 are processed independently.

A scheduler result of "FirstIn" occurs when a ShapeID token, is received from the DALEK 70 and there are no ShapeID tokens in the TARDIS 72—indicated by a Count of zero. "FirstIn" results in the ShapeID token being both returned to the DALEK 70, since it is conforming, and inserted into the Calendar Queue. In addition, the Count is incremented. This shows an important characteristic of the algorithm—a "ghost" ShapeID token remains in the TARDIS 72 although no "real" ShapeID is present. The Count is actually the number of "real" ShapeID tokens plus one "ghost."

A scheduler result of "NextIn" occurs when a ShapeID token is received from the DALEK 70 and there are already ShapeID token(s) in the TARDIS 72—indicated by the Count being non-zero. "NextIn" results in the ShapeID token being held in the TARDIS 72 in the form of an increment to the Count. The ShapeID token is not returned to the DALEK 70 because the shape is currently non-conforming. Nor is it inserted in a Calendar Queue because a ShapeID token is already present.

A scheduler result of "NextOut" occurs when the ShapeID token at the head of the "mature" list is sent to the DALEK 70, and there are multiple ShapeID tokens in the TARDIS 72—indicated by a Count greater than one. "NextOut" results in insertion of the ShapeID token in the Calendar Queue and the Count is decremented. A scheduler result of "GhostOut" occurs when the ShapeID token at the head of the "mature" list is sent to the DALEK 70, and there is only a "ghost" ShapeID token in the TARDIS 72—indicated by a Count of one. "GhostOut" results in the Count being set to zero. This extra "ghost" ShapeID is ignored by the DALEK 70 since it finds no CD to output to the system.

Following "FirstIn" and "NextOut" scheduling results in the ShapeID token must be appended to a Calendar Queue list—the list for the Schedule Time. The decision of exactly where to place each ShapeID is complicated by two factors:
1. The Calendar Queue has 64K entries, so the pointer wraps around regularly.
2. Congestion in the "mature" list can put the Schedule Time in the "past."The table of FIG. 16 defines the truth table for Calendar Queue insertion time calculations. If "Current Time" is selected then the ShapeID token is placed in the (Current Time+1) Calendar Queue. It is then appended to the "mature" list in the next Main Timing Sequence.

The operation sequences carried out by the TARDIS 72 are tightly coupled to the Main Timing Sequence. The sequences are named Schedule, Mature and Management.

Schedule Sequence

This sequence carries out scheduling of a ShapeID. It is initiated either by reception of a ShapeID token from the DALEK 70 or by transmission of a ShapeID token to the DALEK 70 from the "mature" list. It inserts a ShapeID entry in the Calendar Queue and updates the Deferred Count. The table of FIG. 17 illustrates this sequence:
1. GCRA RAM: Read current GCRA Configuration and State for the ShapeID.
2. Execution of the Scheduling Algorithm in internal logic.
3. GCRA RAM: Write updated GCRA Configuration and State.
4. MINT RAM: Read the current Head/Tail of the Schedule Time Calendar Queue.
5. MINT RAM: Write updated Head/Tail of the Schedule Time Calendar Queue.
6. LINK RAM: Write the link from the old Calendar Queue Tail to the new Tail.

The MINT RAM and LINK RAM operations are only performed if the scheduling algorithm returns a result of "FirstIn" or "NextOut."

Mature Sequence

This sequence transfers a list of ShapeID tokens from the Current Time Calendar Queue to the tail of the "mature" linked list and loads the first three ShapeID tokens into the TARDIS 72. It is initiated once in each Main Timing Sequence. The table of FIG. 18 shows the sequence of
1. MINT RAM: Read the Current Time list from the Calendar Queue.
2. MINT RAM: Clear the Current Time list in the Calendar Queue.
3. LINK RAM: Links the Current Time list to the tail of the "mature" list.
4. LINK RAM: Reads the next (second) ShapeID token in the "mature" list.
5. LINK RAM: Reads the next (third) ShapeID token in the "mature" list.

Management Sequence

This sequence writes or reads a Minimum Cell Interval to/from the GCRA RAM. These operations allow the configuration and monitoring of Minimum Cell Intervals by the CPU. The table of FIG. 19 illustrates this sequence. The table shows the sequence of:
1. The address (ShapeID) pointed to by the Write Register WR_SID is read, the data (MCI) is place in the Read Register RR_MCI_INT and RR_MCI_FRA. The Read Registers are only loaded for a Read Request.
2. The address (ShapeID) pointed to by Write Register WR_SID is written using the data (MCI) in Write Registers WR_MCI_INT and WR_MCI_FRA. This step only occurs for a Write Request.

Example Overall Sequence

An example overall sequence carried out by the TARDIS 72 is shown in FIG. 20. Such a sequence is run in each Main Timing Sequence. Each overall sequence combines the Schedule, Mature and Management sequences described above. The example in FIG. 20 illustrates a worst case scenario in which:
1. Three ShapeID tokens from the DALEK 70, all with schedule "Firstin".
2. Three "mature" ShapeID tokens to the DALEK 70, all with Schedule result of "NextOut".
3. CPU-requested GCRA RAM Configuration Write.

DALEK Block

Figure 21:
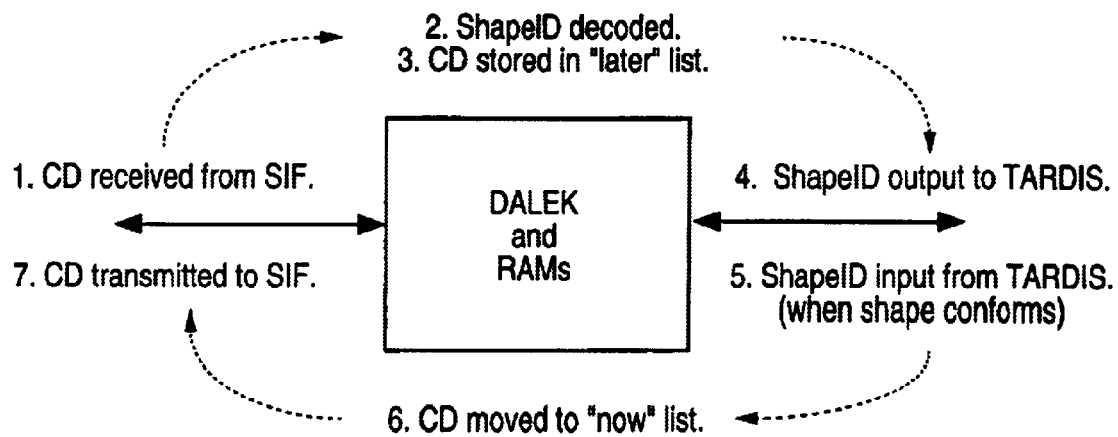
FIG. 21 is a diagram illustrating the data flow of the CD and ShapeID through the CD-processing block.

The DALEK controls storage of the Cell Descriptors (CDs) currently residing in the shaper, including the management of linked lists for each Connection ID. FIG. 21 illustrates the flow of a CD and associated ShapeID token into and out of the CD-processing functional block, or DALEK 70. When a CD is received from the system, the ShapeID look-up is first performed. The CD is stored in a "later" list, and the ShapeID token is output to the TARDIS 72. When the shape conforms, the ShapeID token is input to the DALEK 70 from the TARDIS 72. The CD is moved to the "now" list, and the CD is transmitted back to the system.

The DALEK 70 operates using sequences synchronized to the system Main Timing Sequence. Sequence synchronization is provided by the TARDIS 72. The Main Timing Sequence is 37 clock periods in length. This is approximately 685 ns or one-cell time in a STS-12c based system. A per-ConnectionID configurable CLP Option field allows each CD to be processed as either "CLP clear" or "CLP unchanged". CDs on "CLP clear" ConnectionIDs have their CLP bit reset on entry to the DALEK 70. CDs on "CLP unchanged" ConnectionIDs have their CLP bit passed unchanged. The CLP, and its associated parity bit, are the only fields of CDs modified by the DALEK 70.

The data structures managed by the DALEK 70 and the flow of data through the DALEK 70 will now be described. At any time, each CD in the DALEK 70 is stored in one of two linked list structures. A set of "later" linked lists, one for each ShapeID, holds CDs from when they are received until they are ready for transmission. A "now" linked list holds all CDs that are ready for transmission.

Up to three CDs may be received from the system in each Main Timing Sequence. Each CD includes a ToShape bit and a ConnectionID field. Each CD with the ToShape bit set, for which a valid ConnectionID to ShapeID mapping exists, is stored by the DALEK 70 in an external RAM array—the DATA BUFFER 703. Once stored, a CD is not moved when transferred between lists, instead the links are manipulated. Links are stored as part of the CD in the DATA BUFFER 703.

An external RAM array called the SHAPE RAM 701, holds the mapping table from ConnectionID to ShapeID. Shaping is carried out on ShapeIDs. Multiple ConnectionIDs may be mapped to a single ShapeID. The CLP Option field for ConnectionID is stored in the SHAPE RAM 701 alongside its ShapeID. CDs with the ToShape bit set are appended to one of 16K "later" linked lists. The "later" lists are priority-based, applying a 4-level priority from a field in the CD. This field defines priority within the shaped connection—usually the VC priority. Heads and Tails of the "later" lists are stored in a separate external RAM array called the COIN RAM 702.

Concurrently with storing a received CD, the DALEK 70 sends the ShapeID token to the TARDIS 72 for GCRA evaluation. The CD remains in the "later" list until it reaches the head of the list and the ShapeID is input from the TARDIS 72. A ShapeID token input from the TARDIS 72 indicates that a CD with that ShapeID may be output to the system. The CD chosen is that at the highest priority occupied list for that ShapeID. It is transferred from the head of the "later" list to the tail of the "now" list.

The "now" list provides an output queue to accommodate CDs which are ready for immediate output. This list is necessary since only one CD may output to the system in each Main Timing Sequence, while up to three ShapeIDs may be input from the TARDIS 72. The "now" list is priority-based, applying 4-level priority from a field in the CD. This field defines priority between the shaped connections—usually the VP priority. Heads and Tails of the "now" list are stored within the DALEK 70 since only one "now" list exists.

Figure 22:
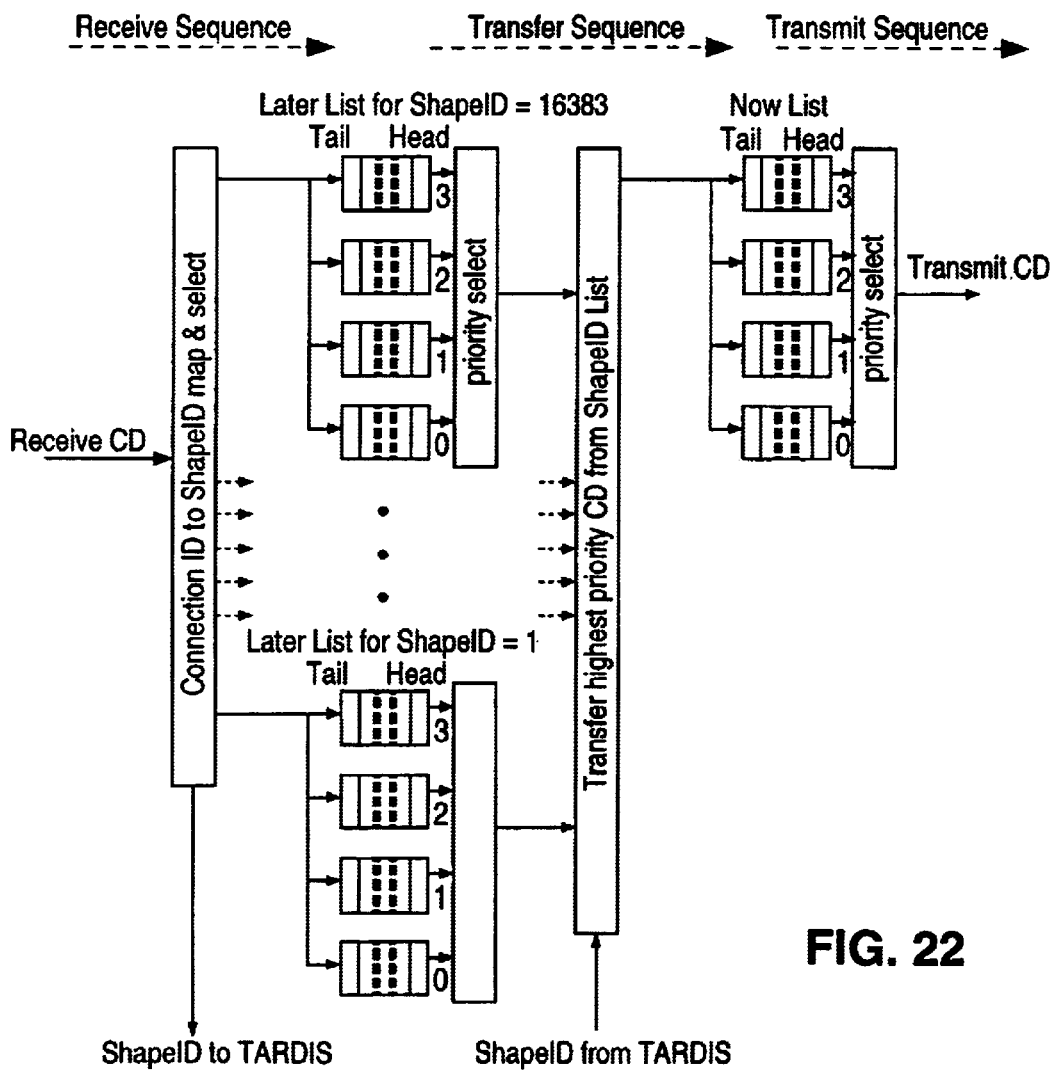
FIG. 22 is a diagram of the data structures and data flow in the CD-processing block.

The data held in all three external RAM arrays is protected by parity bits. Parity is checked following every memory read operation and any error flagged. Similarly, the parity of CDs received from the system is checked and the errors flagged. FIG. 22 illustrates these data structures and data flow through the DALEK 70.

The operation sequences performed by the DALEK 70 are tightly coupled with the Main Timing Sequence. The sequences are named Receive, Transfer, Transmit, and Management.

Receive Sequence

This sequence accepts a CD from the system, decodes the ShapeID and appends the CD to the ShapeID "later" linked list. A ShapeID token is passed to the TARDIS 72 during this sequence. The table of Figure illustrates this sequence:

1. SHAPE RAM: Read ShapeID, decoded from the CD ConnectionID field.
2. COIN RAM: Read Head/Tail of ShapeID/Priority list, then write updated data.
3. DATA BUFFER: Write CD and null link, then write link to old Tail of list.

Transfer Sequence

This sequence transfers a CD from the "later" linked list to the "now" linked list. The transfer is initiated by the receipt of a ShapeID token from the TARDIS 72. The table of FIG. 24 illustrates this sequence:

1. COIN RAM: Read Head/Tail of all 4 priority "later" lists.
2. DATA BUFFER: Read "now" Priority and LINK at Head of chosen "later" list.
3. COIN RAM: Write new Head/Tail of "later" list (from Data Buffer link).
4. DATA BUFFER: Write link to new Tail of "now" list.

Transmit Sequence

This sequence reads a CD from the "now" linked list and outputs the CD to the system. The table of FIG. 25 illustrates this sequence:

1. DATA BUFFER: Read the CD word by word
2. CD_Data bus driven
3. CD_SHP_RDY asserted Management Sequence This sequence writes a ShapeID to the SHAPE RAM (if requested), and reads a ShapeID from the SHAPE RAM. These operations allow the configuration and monitoring of ConnectionID to ShapeID mappings in the DALEK 70. The table of FIG. 26 illustrates this sequence:

1. The address (ConnectionID) pointed to by write register CPU_WR-CID is written using the data (ShapeID) in write register CPU_WR_SID.
2. The address (ConnectionID) pointed to by CPU_WR_CID is read, the data (ShapeID) being placed in read register CPU_RD_SID.

Example Overall Sequence

FIG. 27 illustrates an example overall sequence carried out by the DALEK 70. Such a sequence is run in each Main Timing Sequence. Each overall sequence combines the Receive, Transfer, Transmit and Management sequences described in the preceding section. The example overall sequence chosen here illustrates the worst case scenario in which:

1. Three CDs received from the system, initiating three Receive Sequences.
2. Three ShapeID tokens returned from the TARDIS 72, initiating three Transfer Sequences.
3. "Now" list occupied, initiating a Transmit Sequence.
4. CPU_SR_WRREQ bit asserted, initiating a Management Sequence.

As defined herein, the present invention's use of "now" and "later" lists with per-connection ShapeIDs provides priority within a virtual connection (VC) and a virtual path (VP), respectively. This effectively preserves the relative priority for connections being shaped within a VP. Also, the use of a Calendar Queue reduces the complexity of a "virtual finishing time" (VFT) calculation, such that the resultant VFT has a constant-time bound on its algorithmic complexity [O(1) versus O(N log N)]. Finally, the use of an "active list" reduces the complexity of the per-connection scheduling.

Those skilled in the art will appreciate that various adaptations and modifications of the just-described embodiments can be configured without departing from the scope and spirit of the invention. Therefore, it is to be understood that, within the scope of the appended claims, the invention may be practiced other than as specifically described herein.

What is claimed is:

1. A shaper unit comprising:
   a Cell Descriptor (CD) processing block comprising a processing block that receives and processes a plurality of CDs, a SHAPE RAM that holds a mapping table from a ConnectionID to a ShapeID, a COIN RAM that stores heads and tails of "later" lists, and a DATA BUFFER array that stores the plurality of CDs; and
   a ShapeID processing block comprising a processing block that processes a plurality of ShapeIDs, a Generic Cell-Rate Algorithm (GCRA) RAM that stores per-shape GCRA configuration and state data, and a LINK RAM that stores a Calendar Queue linked list array;
   wherein the CD processing block outputs the plurality of ShapeIDs to the ShapeID processing block, the plurality of ShapeIDs corresponding to the plurality of CDs received by the CD processing block; and
   wherein the ShapeID processing block processes the plurality of ShapeIDs to control the scheduling of the plurality of CDs out of the shaper unit.

2. The shaper unit of claim 1, wherein the ShapeID processing block further comprises a MINT RAM that stores a Calendar Queue linked list array.

3. A method for shaping cell traffic in a network switch, the method comprising:
   receiving a Cell Descriptor (CD) in a CD processing block;
   decoding a ShapeID from the CD and storing the CD in a "later" list;
   outputting the ShapeID to a ShapeID processing block;
   checking the conformance of the ShapeID;
   if the ShapeID is conforming, then transferring the ShapeID back to the CD processing block;
   if the ShapeID is not conforming, then inserting the ShapeID into a Calendar Queue, and when the ShapeID is mature, transferring the ShapeID from the Calendar Queue to a mature list, and then transferring the ShapeID back to the CD processing block;
   moving the CD to a "now" list, when the ShapeID is received by the CD processing block; and
   outputting the CD from the CD processing block.

4. The method of claim 3, wherein the use of the "now" and "later" lists with per-connection ShapeIDs provides priority within a virtual connection (VC).

5. The method of claim 4, wherein when the ShapeID matures, the CD processing block determines which VC to send out, such that a higher priority VC is sent before a lower priority VC, even if the higher priority VC did not generate the ShapeID.

6. The method of claim 3, wherein each connection is shaped to a different rate.

7. The method of claim 3, wherein a plurality of connections are all set to a same ShapeID.

8. A communications system comprising:
   a plurality of sources for supplying information;
   a plurality of destinations for receiving the information from the plurality of sources;
   one or more nodes forming a network connecting the plurality of sources to the plurality of destinations, the network having a plurality of channels for transporting the information, wherein each node includes a queuing control unit comprising:
      a queue manager;
      a discard block;
      a shaper comprising:
         a Cell Descriptor (CD) processing block; and
         a ShapeID processing block;
         wherein the CD processing block:
            receives a plurality of Cell Descriptors (CDs);
            decodes a plurality of corresponding ShapeIDs from the plurality of CDs and stores the plurality of CDs in a "later" list; and
            outputs the plurality of ShapeIDs to the ShapeID processing block;
         wherein the ShapeID processing block processes the plurality of ShapeIDs to control the scheduling of the plurality of CDs out of the shaper;
      a per port queue unit for receiving and processing the plurality of CDs outputted by the shaper;
      a de-queue unit for receiving and processing an output from the per port queue unit;
      a multicast server for receiving and processing an output from the de-queue unit; and
      a free buffer list unit for receiving and storing an output from the multicast server.

9. The communications system of claim 8, wherein the ShapeID processing block:
   checks the conformance of the each of the plurality of ShapeIDs;
   if the ShapeID conforms, then transfers the ShapeID back to the CD processing block;
   if the, ShapeID does not conform, then inserts the ShapeID into a Calendar Queue, and when the ShapeID is mature, transfers the ShapeID from the Calendar Queue to a mature list, and then transfers the ShapeID back to the CD processing block.

10. The communications system of claim 9, wherein when the CD processing block receives the ShapeID from the ShapeID processing block, the CD processing block:
   moves the CD corresponding to the ShapeID to a "now" list, and outputs the CD corresponding to the ShapeID.

* * * * *